(12) United States Patent
Sumiya

(10) Patent No.: US 10,365,128 B2
(45) Date of Patent: Jul. 30, 2019

(54) DISPLAY DEVICE

(71) Applicant: DENSO CORPORATION, Kariya (JP)

(72) Inventor: Minoru Sumiya, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 7 days.

(21) Appl. No.: 15/558,044

(22) PCT Filed: Apr. 15, 2016

(86) PCT No.: PCT/JP2016/002041
§ 371 (c)(1),
(2) Date: Sep. 13, 2017

(87) PCT Pub. No.: WO2017/002289
PCT Pub. Date: Jan. 5, 2017

(65) Prior Publication Data
US 2018/0066967 A1 Mar. 8, 2018

(30) Foreign Application Priority Data
Jul. 1, 2015 (JP) ................................. 2015-132964

(51) Int. Cl.
G01D 7/04 (2006.01)
B60K 35/00 (2006.01)
(Continued)

(52) U.S. Cl.
CPC ............ G01D 13/04 (2013.01); B60K 35/00 (2013.01); B60K 37/02 (2013.01); G01D 7/04 (2013.01);
(Continued)

(58) Field of Classification Search
CPC .......... G01D 13/04; G01D 11/28; G01D 7/04; G01D 13/20; B60K 35/00; B60K 37/02; B60K 2350/2021; B60K 2350/2095
(Continued)

(56) References Cited

U.S. PATENT DOCUMENTS 2,195,672 A * 4/1940 Gerrells .................. G01D 11/28
362/23.01
2,252,647 A * 8/1941 Schmitz .................. G04B 19/18
29/896.3
(Continued)

FOREIGN PATENT DOCUMENTS

CN 1938566 A 3/2007
CN 1970341 A 5/2007
(Continued)

Primary Examiner — Nimeshkumar D Patel
Assistant Examiner — Tania C Courson
(74) Attorney, Agent, or Firm — Harness, Dickey & Pierce, P.L.C.

(57) ABSTRACT

A display device includes a dial, a substrate, a plurality of light source parts, and a transmittance adjustment part. The transmittance adjustment part has a low transmittance part in which a transmittance of light is lower than a predetermined value and a high transmittance part in which a transmittance of light is higher than that of the low transmittance part, and adjusts a transmittance of light from the plurality of light source parts. Each of the light source parts includes a first light source and a second light source having different light-emission colors to be alternately switched on lighting. The low transmittance part is arranged within an area corresponding to the plurality of light source parts. The high transmittance part is located based on a midpoint position where the distance from the adjacent light source parts is equal in the circumferential direction between the light source parts.

3 Claims, 6 Drawing Sheets

(51) Int. Cl.
*B60K 37/02* (2006.01)
*G01D 11/28* (2006.01)
*G01D 13/04* (2006.01)
*G01D 13/20* (2006.01)

(52) U.S. Cl.
CPC ............ *G01D 11/28* (2013.01); *G01D 13/20* (2013.01); *B60K 2350/2021* (2013.01); *B60K 2350/2095* (2013.01)

(58) Field of Classification Search
USPC .......................................................... 116/202
See application file for complete search history.

(56) References Cited

U.S. PATENT DOCUMENTS

| | | | | | |
|---|---|---|---|---|---|
| 3,890,716 | A * | 6/1975 | Hatch | ................ | G01D 13/10 116/298 |
| 4,875,433 | A * | 10/1989 | Tsukamoto | ........... | G01D 11/28 116/335 |
| 5,734,627 | A * | 3/1998 | Sy | ..................... | G04B 19/30 313/113 |
| 5,894,457 | A * | 4/1999 | Luth | .................. | G04C 17/00 368/108 |
| 6,226,588 | B1 * | 5/2001 | Teramura | ........... | B60K 31/0008 123/319 |
| 6,408,784 | B1 * | 6/2002 | Ross | ................... | G01D 11/28 116/288 |
| 6,573,877 | B2 * | 6/2003 | Wedel | ................ | G01D 11/28 345/4 |
| 6,925,959 | B2 * | 8/2005 | Wehner | .............. | B60K 35/00 116/286 |
| 6,926,417 | B2 * | 8/2005 | Mikami | .............. | G01D 11/28 116/DIG. 36 |
| 6,938,551 | B2 * | 9/2005 | Inoue | ................... | B41M 5/502 101/35 |
| 7,752,992 | B2 * | 7/2010 | Takeshige | ............ | B60K 37/02 116/286 |
| 7,784,422 | B2 * | 8/2010 | Repetto | .............. | B60K 31/042 116/62.1 |
| 8,964,512 | B2 * | 2/2015 | Fleury | ................. | G04B 19/12 368/205 |
| 9,200,930 | B2 * | 12/2015 | Birman | .............. | G01D 13/265 |
| 9,739,648 | B2 * | 8/2017 | Takeda | ................ | G01D 13/02 |
| 2006/0077068 | A1 * | 4/2006 | Harada | ................ | B60K 37/02 340/815.86 |
| 2006/0185576 | A1 * | 8/2006 | Tane | .................... | G01D 11/28 116/288 |
| 2007/0121312 | A1 | 5/2007 | Kim et al. | | |
| 2008/0271632 | A1 | 11/2008 | Tamura et al. | | |
| 2008/0276857 | A1 * | 11/2008 | Fournier | ............. | G01D 11/28 116/202 |

FOREIGN PATENT DOCUMENTS

| | | |
|---|---|---|
| JP | 2000221058 A | 8/2000 |
| JP | 2009258004 A | 11/2009 |

* cited by examiner

DISPLAY DEVICE

CROSS REFERENCE TO RELATED APPLICATIONS

This application is a U.S. National Phase Application under 35 U.S.C. 371 of International Application No. PCT/JP2016/002041 filed on Apr. 15, 2016 and published in Japanese as WO 2017/002289 A1 on Jan. 5, 2017. This application is based on and claims the benefit of priority from Japanese Patent Application No. 2015-132964 filed on Jul. 1, 2015. The entire disclosures of all of the above applications are incorporated herein by reference.

TECHNICAL FIELD

The present disclosure relates to a display device, for example, for being suitably used in a combination meter for a vehicle.

BACKGROUND ART

A conventional display device is known, which is described in Patent Literature 1. The display device (lighting device) of Patent Literature 1 includes a sector-shaped dial having numeric characters and scales formed in the circumferential direction, a substrate arranged at the back side of the dial, light sources (LED) arranged on the substrate in the circumferential direction, and a light introducing object interposed between the dial and the substrate to lead the light from the light source to the dial.

RGB full color LED is used as the light sources. Blue, green, yellow, orange and red lights are emitted in this order from the small numeric character side towards the large numeric character side in the circumferential direction of the dial. When the light sources are turned on, the luminescence forms a gradation on the dial.

PRIOR ART LITERATURES

Patent Literature

Patent Literature 1: JP 2009-258004 A

SUMMARY OF INVENTION

Instead of using the light introducing object of Patent Literature 1, the luminosity balance between the light source parts may be controlled by adjusting the transmittance from the light source part, using a light-and-shade part formed on the dial by photograph method. Specifically, the light-and-shade part is relatively dark in an area corresponding to each of the light source parts, and the light-and-shade part is relatively light in an area distant from each of the light source parts, such that the luminosity balance is controlled over the dial.

In case where each of the light source parts has a first light source and a second light source different in color to make the dial to emit two colors alternately switched on, depending on the arrangement of the first light source and the second light source in each of the light source parts, one light source may be partially interrupted by the other light source. Therefore, while the luminosity balance is controlled overall by the light-and-shade part without being interrupted when the first light source is turned on, unevenness may be generated in the lighting when the second light source is turned on, since the luminosity balance controlled by the light-and-shade part is affected by the interruption.

It is an object of the present disclosure to provide a display device with a light-and-shade part on a dial, the luminescence color on the dial being changed by two-color light source, by which unevenness is restricted from being generated in luminosity when either light source is turned on.

According to an aspect of the present disclosure, a display device includes: a dial, a substrate, a plurality of light source parts, and a transmittance adjustment part. The dial has an information item disposed around an outer periphery side with respect to a predetermined central part in a circumferential direction. The substrate is arranged at a side of the dial opposite from a visual confirmation side. The plurality of light source parts is arranged on the substrate in the circumferential direction to correspond to the information item, and the light source part causes the information item to emit light. The transmittance adjustment part is arranged on the dial to face the substrate, and has a low transmittance part in which a transmittance of light is lower than a predetermined value and a high transmittance part in which a transmittance of light is higher than that of the low transmittance part. The transmittance adjustment part adjusts a transmittance of light from the plurality of light source parts. Each of the light source parts includes a first light source and a second light source having different light-emission colors to be alternately switched on lighting.

The first light source and the second light source are arranged in a same alignment order radially from the predetermined central part. The low transmittance part is located within an area corresponding to the plurality of light source parts, and the high transmittance part is located based on a midpoint position where a distance from the light source parts adjacent to each other is equal in the circumferential direction between the light source parts.

The information item arranged on the dial emits light, due to the plural luminescence parts disposed on the substrate. Moreover, the transmittance adjustment part is defined on a surface of the dial which faces the substrate. The low transmittance part of the transmittance adjustment part is arranged in the area corresponding to the plural light source parts. Therefore, the light transmittance can be reduced to some extent while the information item in the area corresponding to the light source parts receives much volume of light from the light source part. Moreover, the high transmittance part of the transmittance adjustment part is located at the midpoint position between the adjacent light source parts. Therefore, the light transmittance can be maintained for the information item corresponding to the area between the light source parts, while the volume of light from the light source part is small. Thus, the luminosity balance (evenness) can be obtained over whole the information item.

The luminescence color is different between the first light source and the second light source of the light source part, and the first light source and the second light source are capable of alternately switched on lighting. The lighting condition of the information item can be switched between the different colors. The first light source and the second light source are arranged radially from the predetermined central part, and the arranged order is the same among the light source parts. Therefore, the first light source is not interrupted by the second light source when the first light source is turned on, and the second light source is not interrupted by the first light source when the second light source is turned on, such that it becomes possible to emit light towards the respective area and the adjacent area of the adjacent light source.

Because each of the light sources is not affected by the other light sources, approximately the same luminosity is obtained at the low transmittance part between when the first light source is turned on, and when the second light source is turned on.

Moreover, the high transmittance part is located at the midpoint position where the distance from the light source parts is approximately the same. Similarly, because the light source is not affected by the other light sources, approximately the same luminosity is obtained at the high transmittance part between when the first light source is turned on, and when the second light source is turned on.

Therefore, approximately the same luminosity balance can be obtained when the first light source is turned on and when the second light source is turned on, due to the low transmittance part and the high transmittance part of the transmittance adjustment part. Accordingly, unevenness in the luminosity can be restricted from being generated by the first light source and the second light source.

In other words, if the spatial relationship between the first light source and the second light source is arbitrarily set in each of the light source parts, the luminosity balance can be controlled by the transmittance adjustment part for one of the first light source and the second light source. However, the luminosity balance may not be suitably controlled by the transmittance adjustment part for the other side. Such a situation can be avoided.

DESCRIPTION OF EMBODIMENTS

Figure 1:
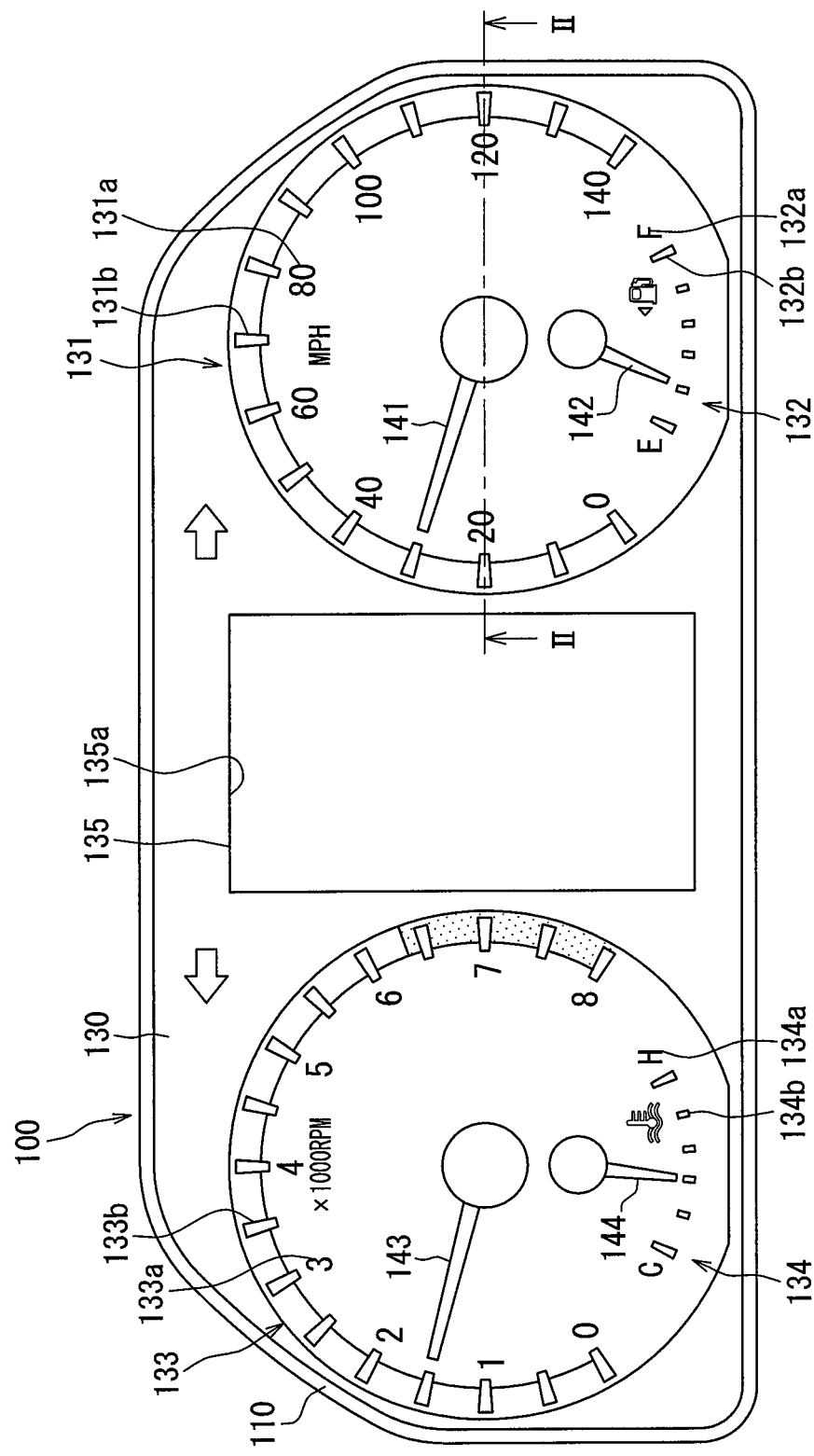
FIG. 1 is a front view illustrating a combination meter according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
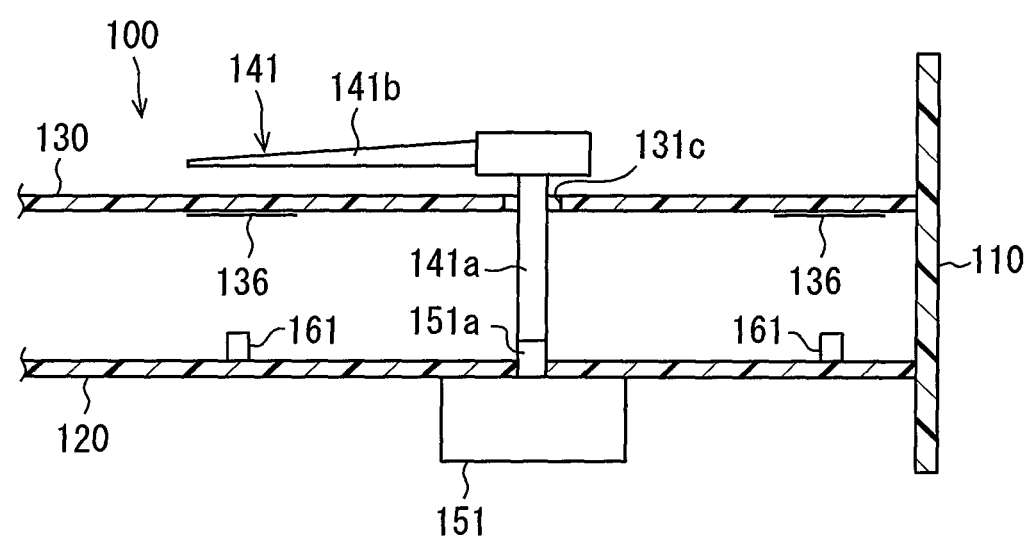
FIG. 2 is a sectional view taken along II-II of FIG. 1.

A first embodiment is described with reference to FIG. 1 to FIG. 4. A display device of the first embodiment is applied to a combination meter 100 for a vehicle, and displays various vehicle information such as vehicle speed, fuel residual quantity, engine revolving speed, cooling water temperature, as relevant information relevant to the vehicle, as shown in FIG. 1 and FIG. 2, to a user (a person who visually confirms) of the vehicle.

The combination meter (hereafter referred to the meter) 100 is positioned at a center of an instrument panel (hereafter referred to the panel) of the vehicle, or at a position opposing the user (driver). The meter 100 includes a case 110, a substrate 120, a dial 130, indicators 141-144, a motor 151, and a light source part 161.

The light source part 161 of the meter 100 has a first light source 161a and a second light source 161b to enable switching in two-color luminescence to the dial 130. When the dial 130 is made to emit light by the light source part 161, a light introducing object is not used fundamentally. The balance (homogeneity) in the overall light-emitting condition is obtained by a light-and-shade translucent part 136 (to be mentioned later) provided to the dial 130.

The case 110 is a pipe-shaped container made of resin and shaped in, for example, an oblong rectangle as a front form, and the right corner and the left corner are cut. The case 110 forms a main body of the meter 100.

The substrate 120 is made of, for example, a glass epoxy board, and forms an electric circuit unit of the meter 100. The substrate 120 is shaped in an oblong rectangle equivalent to the front form of the case 110, and is arranged at one side of the case 110 in the axial direction and fixed to one end side opening of the case 110. The motor 151 and the light source part 161, to be mentioned later, are disposed on the substrate 120.

The dial 130 is, for example, a thin board component shaped in an oblong rectangle and made of translucent material (such as transparent polycarbonate resin). The dial 130 is arranged at the other side of the case 110 in the axial direction, and is fixed to the other end side opening of the case 110. A speed display part 131, a fuel residual quantity display part 132, a rotation display part 133, a water temperature display part 134, and an opening 135a for a vehicle information display section 135 are formed on the front side of the dial 130 (facing the user). The light-and-shade translucent part 136 is formed on the back side of the dial 130 (facing the substrate 120).

The speed display part 131 displays the traveling speed of the vehicle (vehicle speed), and is located at the right side of the dial 130. The speed display part 131 basically has a round shape with a band-shaped (arc-shaped) area extending clockwise from the lower left side to the lower right side around the outer periphery side of the round shape. The speed display part 131 includes a numeric character part 131a and a scale part 131b, each of which is arranged in the circumferential direction to indicate the vehicle speed value. The numeric character part 131a includes numeric characters (0, 20, 40-140) in increments of 20, and the numeric characters are arranged clockwise from the lower left side to the lower right side of the speed display part 131 to become larger. The numeric character part 131a provides numeric values based on MILE/H (MPH).

The fuel residual quantity display part 132 displays the fuel residual quantity, and is arranged at the lower side of the speed display part 131. The fuel residual quantity display part 132 is shaped in a round shape corresponding to the speed display part 131, with a band-shaped (arc-shaped) area on the lower periphery side of the round shape. The fuel residual quantity display part 132 has a character part 132a and a scale part 132b arranged in the circumferential direction to indicate the fuel residual. The character part 132*a* includes the characters of "E (empty)" on the left side and "F (full)" on the right side of the fuel residual quantity display part 132.

The rotation display part 133 displays the engine revolving speed of the vehicle, and is arranged on the left side of the dial 130. The rotation display part 133 is shaped in a round shape basically with a band-shaped (arc-shaped) area on the outer periphery side of the round shape, clockwise from the lower left side to the lower right side. The rotation display part 133 includes a numeric character part 133*a* and a scale part 133*b* arranged in the circumferential direction to indicate the engine revolving speed. The numeric character part 133*a* is formed such that the indicated value becomes larger clockwise from the lower left side to the lower right side, for example, incremented by 1 (0, 1, 2-8 (×1000) RPM).

The water temperature display part 134 displays the engine-cooling-water temperature of the vehicle, and is arranged at the lower side of the rotation display part 133. The water temperature display part 134 is formed in the round shape corresponding to the rotation display part 133, with a band-shaped (arc-shaped) area on the lower periphery side of the round shape. The water temperature display part 134 has a character part 134*a* and a scale part 134*b* arranged in the circumferential direction to indicate the cooling water temperature. The character part 134*a* includes the characters of "C (cool)" on the left side and "H (hot)" on the right side of the water temperature display part 134.

The numeric character parts 131*a*, 133*a*, the character parts 132*a*, 134*a*, and the scale parts 131*b*-134*b* of the display parts 131-134 correspond to information item.

The vehicle information display section 135 displays the variety of vehicle information on, for example, a liquid crystal display and is arranged at the central part of the dial 130, i.e., between the speed display part 131 and the rotation display part 133. The vehicle information display section 135 is shaped in a rectangle longer in the up-down direction than in the left-right direction. The opening 135*a* is formed in the dial 130 to correspond to this area, and is formed so that the screen of the liquid crystal display is sighted from the opening 135*a*. The vehicle information display section 135 displays various vehicle information such as selection position of a select lever, mileage, outside air temperature, fuel efficiency, driving possible distance, based on signals acquired from various vehicle sensors.

The dial 130 has a round opening 131*c* opened at the central part of the speed display part 131, and an axial part 141*a* of the indicator 141 passes through the opening 131*c*. Similarly, openings for the indicators 142-144 are formed respectively at the central parts of the fuel residual quantity display part 132, the rotation display part 133, and the water temperature display part 134.

A light-blocking print paint (for example, black paint) is given to the dial 130 within an area except the numeric character parts 131*a*, 133*a*, the character parts 132*a*, 134*a*, and the scale parts 131*b*-134*b*. In other words, the area in which the numeric character parts 131*a*, 133*a*, the character parts 132*a*, 134*a*, and the scale parts 131*b*-134*b* are formed is translucent without the print paint (black paint), such that light can be emitted toward the user by the light source parts 161 to be mentioned later.

Figure 3:
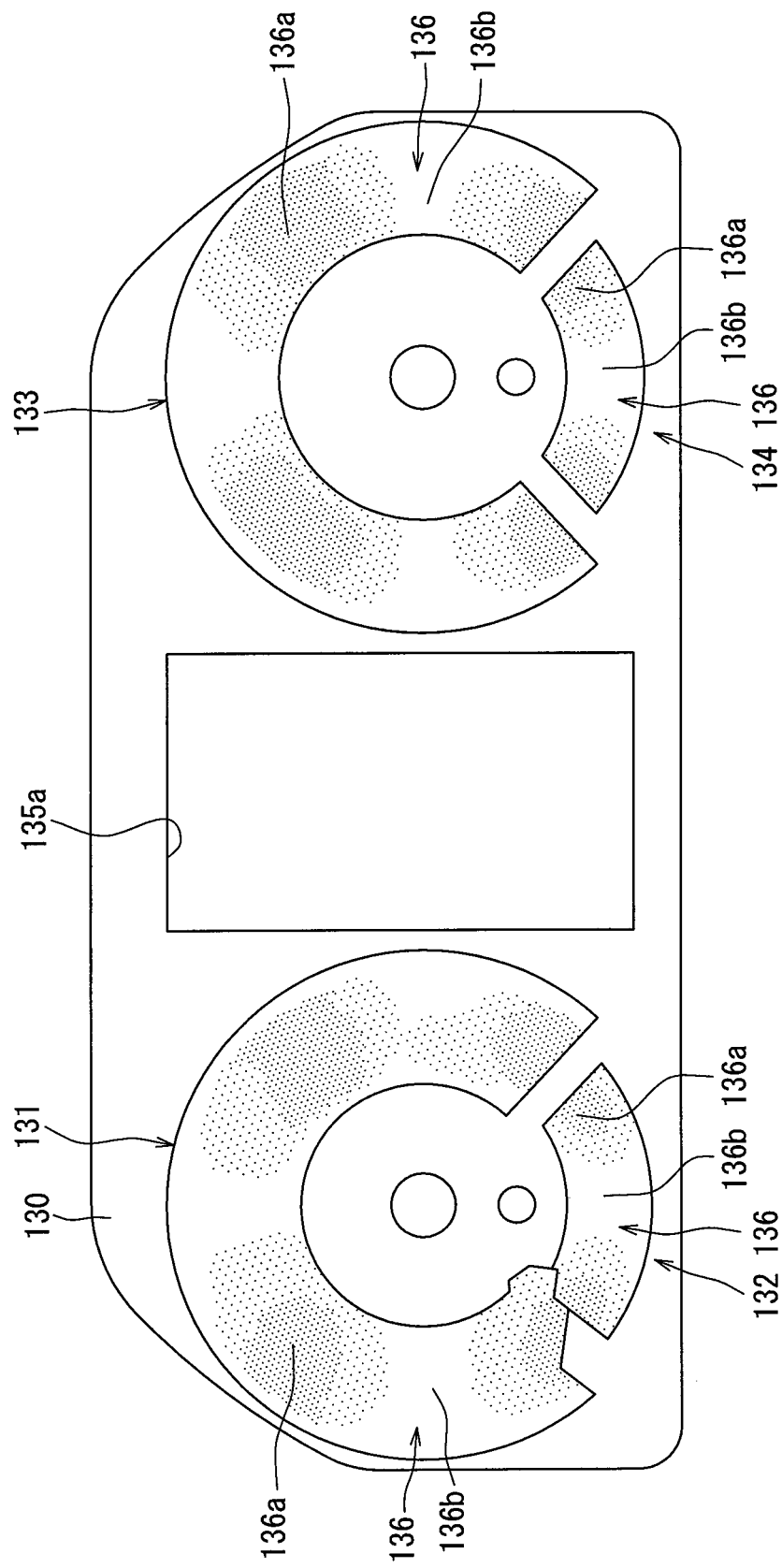
FIG. 3 is a diagram illustrating a light-and-shade translucent part formed on a back side of a dial.

As shown in FIG. 3, the light-and-shade translucent part 136 is formed by a printing method on the back side of the dial 130 to define shade, and has the dark part 136*a* and the light part 136*b* to adjust the transmittance of the light from the light source parts 161 to be mentioned later. The light-and-shade translucent part 136 corresponds to a transmittance adjustment part having a low transmittance part and a high transmittance part. The dark part 136*a* corresponds to the low transmittance part in which the transmittance of light is set lower than a predetermined value. The light part 136*b* corresponds to the high transmittance part in which the transmittance of light is set higher than that of the low transmittance part. Since FIG. 3 is a drawing seen from the back side of the dial 130, the spatial relationship in left-right direction of FIG. 3 is reverse relative to FIG. 1.

The plural light source parts 161 are arranged on the substrate 120 at a predetermined interval in the circumferential direction, and corresponds to each of the display parts 131-134, to be mentioned later. Specifically, the light-and-shade translucent part 136 changes the transmittance of light emitted from the light source parts 161 over the circumferential direction in each of the display parts 131-134. The light-and-shade translucent part 136 is formed by, for example, black dot printing, to improve the balance (homogeneity) of luminosity by the light source parts 161 in the circumferential direction of each of the display parts 131-134. The dot printing is formed from the gathering of the small points (halftone dots) regularly located, and the light transmittance degree is changed by the density of the halftone dots.

That is, in each of the display parts 131-134, when seen from the user side, at a position corresponding to the light source part 161, the light source part 161 and the display part 131-134 are close to each other. At a position corresponding to between the light source parts 161, the light source part 161 and the display part 131-134 become far from each other. Therefore, the density of the halftone dots is made high in the dark part 136*a* formed (located) in the area positioned near the light source part 161, i.e., the area corresponding to the light source part 161. Conversely, the density of the halftone dots is made low in the light part 136*b* formed (located) in the area 161 positioned distant from the light source part 161, i.e., the midpoint position between the adjacent light source parts, based on the midpoint position. The details of the midpoint position are mentioned later. The luminosity balance (homogeneity) can be improved in the circumferential direction, for each of the display parts 131-134, by the light-and-shade translucent part 136, without using a common light introducing object.

The indicator 141 indicates the vehicle speed by rotating in the speed display part 131. The indicator 141 is made from translucent material (such as transparent polycarbonate resin, or acrylic resin).

The indicator 141 has the axial part 141*a* and the needle part 141*b*. The axial part 141*a* and the needle part 141*b* are formed integrally with each other. The axial part 141*a* is a rod component extending to the substrate 120 from the front side of the dial 130, and is arranged to pass through the opening 131*c* of the dial 130. The needle part 141*b* is a rod component extending along the surface of the dial 130 toward the scale part 131*b* from the user-side tip end of the axial part 141*a*.

The indicator 142 indicates the fuel residual quantity by rotating in the fuel residual quantity display part 132. The indicator 143 indicates the engine revolving speed by rotating in the rotation display part 133. The indicator 144 indicates the cooling water temperature by rotating in the water temperature display part 134. Each of the indicators 142-144 has the same structure as the indicator 141.

The motor 151 is an actuator to rotate the indicator 141, and is arranged on the (opposite-to-user) surface opposite from the user, at the right side of the substrate 120. The motor 151 is, for example, a stepper motor as a synchronous motor which operates synchronizing with pulse power. The motor 151 is rotated and controlled by a control part of the meter 100.

A shaft 151a of the motor 151 extends to the axial part 141a of the indicator 141, and is connected with the axial part 141a. When the axial part 141a is rotated by the motor 151, the needle part 141b is rotated above the dial 130 (in the speed display part 131). In addition, each of the indicators 142-144 is rotated by a motor similarly for each of the display parts 132-134.

Figure 4:
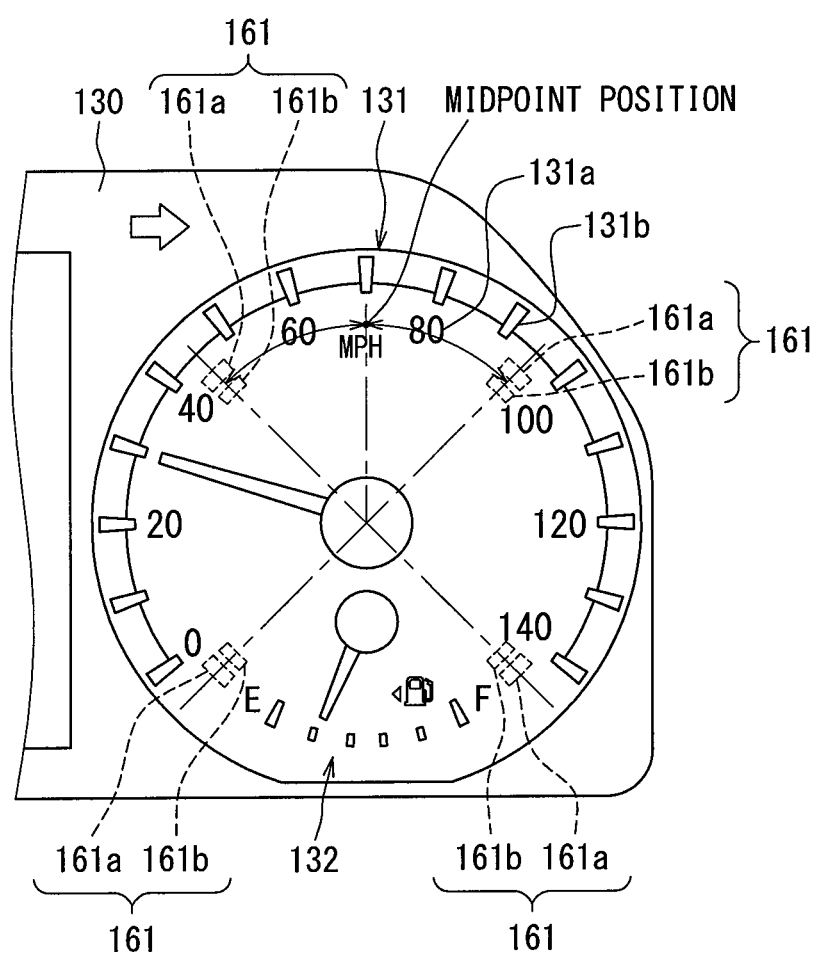
FIG. 4 is a front view illustrating a light source part and an arrangement state of light sources.

As shown in FIG. 4, the light source parts 161 illuminate the respective display parts 131-134 (to emit light) in the dial 130, and are arranged on the surface of the substrate 120 facing the dial 130. When seen from the user side, the light source parts 161 are arranged at a predetermined interval in the circumferential direction to correspond to the display parts 131-134. For example, the light source part 161 is arranged at four places in the circumferential direction of the numeric character part 131a and the scale part 131b with an interval of about 90 degrees, to the speed display part 131, from the adjacency of "0" to the adjacency of "140" of the numeric character part 131a. In addition, among the four light source parts 161, two of the light source parts 161 located at the lower side are used for lighting the fuel residual quantity display part 132.

Furthermore, each of the light source parts 161 has the first light source 161a and the second light source 161b, and both the light sources 161a and 161b are arranged to be adjacent to each other. The first light source 161a and the second light source 161b emit luminescence colors different from each other. The lighting state between the first light source 161a and the second light source 161b is able to be switched by a drive circuit provided on the substrate 120.

Each of the light sources 161a and 161b is made of light emitting diode (LED), for example, the first light source 161a is as a blue light emitting diode, and the second light source 161b is as a red light emitting diode. The driving mode can be selected by the user in this vehicle. When a normal mode is selected, the first light source 161a is turned on to light the dial 130, and each of the display parts 131-134 emits blue light. When a sport mode is selected by the user, the second light source 161b is turned on to light the dial 130, and each of the display parts 131-134 emits read light.

In each of the light source parts 161, the first light source 161a and the second light source 161b are positioned to align in the radial direction from the rotation central part of the indicator 141. The rotation central part is equivalent to a predetermined central part. Among the plural light source parts 161, the arrangement order of the first light source 161a and the second light source 161b in the radial direction is the same. As for the arrangement order, the first light source 161a is more distant from the rotation central part than the second light source 161b is.

As shown in FIG. 4, a midpoint position is defined in the circumferential direction between the adjacent light source parts 161, where the distance from the light source parts 161 is equal. In FIG. 4, the midpoint position is expressed as a position (adjacent to "70") between the light source part 161 near "40" and the light source part 161 near "100", for example, in the numeric character part 131a.

When seen from the user side, the light source parts 161 are arranged at a predetermined interval in the circumferential direction to correspond to each of the display parts 131-134. Therefore, the distance (radius distance) from the rotation central part of the first light source 161a and the second light source 161b is the same among the four positions.

Next, the operation of the meter 100 is explained.

When an ignition switch is turned on to make the vehicle in a driveable state, the indicator 141 (the needle part 141b) is rotated in the speed display part 131 according to the speed, and the speed is displayed by the numeric character part 131a and the scale part 131b to which the indicator 141 points. Moreover, the indicator 142 is rotated in the fuel residual quantity display part 132 according to the fuel residual quantity, and the fuel residual quantity is displayed by the character part 132a and the scale part 132b to which the indicator 142 points.

Moreover, the indicator 143 is rotated in the rotation display part 133 according to the engine revolving speed, and the engine revolving speed is displayed by the numeric character part 133a and the scale part 133b to which the indicator 143 points. Moreover, the indicator 144 is rotated in the water temperature display part 134 according to the engine-cooling-water temperature, and the engine-cooling-water temperature is displayed by the character part 134a and the scale part 134b to which the indicator 144 points.

Moreover, the vehicle information display section 135 displays various vehicle information such as select lever selection position, mileage, outside air temperature, fuel efficiency, and drive possible distance based on signal from various vehicle sensors.

Each of the display parts 131-134 emits light in the dial 130 when the light source parts 161 are turned on. When the driving mode selected by the user is a normal mode, the first light source 161a is turned on in each of the light source parts 161, such that each of the display parts 131-134 emits blue light. When the driving mode selected by the user is a sport mode, the second light source 161b is turned on in each of the light source parts 161, such that each of the display parts 131-134 emits red light.

The light-and-shade translucent part 136 is formed on the back side of the dial 130. The speed display part 131 is explained as a representation among the display parts 131-134. In case where each of the light source parts 161 is turned on, when seen from the user side, the numeric character part 131a and the scale part 131b (information item) in the area corresponding to the light source parts 161 obtain much volume of light from the light source part 161, and the light transmittance is lowered to some extent by the dark part 136a of the light-and-shade translucent part 136.

Moreover, when seen from the user side, the volume of light from the light source part 161 is small at the numeric character part 131a and the scale part 131b (information item) corresponding to an area (midpoint position) between the light source parts 161, and the transmittance is maintained by the light part 136b of the light-and-shade translucent part 136. Thus, in the speed display part 131, the luminosity balance (homogeneity) is improved over the numeric character part 131a and the scale part 131b (information item).

Here, as explained above, the light source part 161 has the first light source 161a and the second light source 161b different in luminescence color and able to be alternately switched on lighting. The lighting condition of the numeric character part 131a and the scale part 131b are able to be switched between the different colors. In this embodiment, the first light source 161a and the second light source 161b are arranged in the radial direction from the rotation central part (predetermined central part), and the arrangement order is made the same among the light source parts 161. Therefore, when the first light source 161*a* is turned on, the first light source 161*a* is not interrupted by the second light source 161*b*. When the second light source 161*b* is turned on, the second light source 161*b* is not interrupted by the first light source 161*a*. Thus, it becomes possible to emit light towards the respective areas and the adjacent area adjacent to the adjacent light source.

The first and second light sources 161*a* and 161*b* are not affected by the other light sources. Therefore, approximately the same luminosity is obtained at the dark part 136*a* either when the first light source 161*a* is turned on, or when the second light source 161*b* is turned on.

The light part 136*b* is arranged based on the midpoint position where the distance from the adjacent light source parts 161 is equal. As mentioned above, the first and second light sources 161*a* and 161*b* are not affected by the other light sources. Similarly, either when the first light source 161*a* is turned on, or when the second light source 161*b* is turned on, approximately the same luminosity is obtained at the light part 136*b*.

Therefore, approximately the same luminosity balance can be obtained at the dark part 136*a* and the light part 136*b* of the light-and-shade translucent part 136, either when the first light source 161*a* is turned on or when the second light source 161*b* is turned on. Thus, unevenness in the luminosity can be restricted from being generated by the first light source 161*a* and the second light source 161*b*.

In other words, if the spatial relationship of the first light source 161*a* and the second light source 161*b* is arbitrarily set in each of the light source parts 161, the light-and-shade translucent part 136 can balance the luminosity for one of the first light source 161*a* and the second light source 161*b*. However, the luminosity balance cannot be improved by the light-and-shade translucent part 136 for the other side. Such a situation can be avoided in the present embodiment.

The control to reduce the unevenness in the luminosity by the arrangement of the light sources 161*a* and 161*b* is described in case of the speed display part 131. Similar effects can be obtained in the fuel residual quantity display part 132, the rotation display part 133, and the water temperature display part 134.

Second Embodiment

Figure 5:
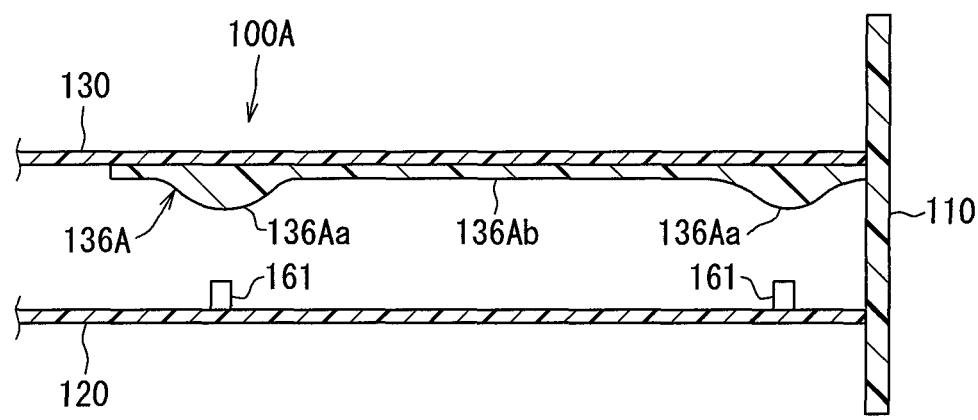
FIG. 5 is a sectional view illustrating a transmittance adjustment part according to a second embodiment.

A meter 100A according to a second embodiment is shown in FIG. 5. The transmittance adjustment part 136A of the meter 100B of the second embodiment is formed by adjusting the thickness of a light-diffusing molded component, in comparison to the transmittance adjustment part (light-and-shade translucent part) 136 of the first embodiment.

The transmittance adjustment part 136A is a tabular molded component colored able to diffuse light (for example, milk white), and is made of, for example, from polycarbonate resin or acrylic resin. The transmittance adjustment part 136A is arranged on the dial 130 to face the substrate 120. The transmittance adjustment part 136A has a thick part 136Aa in which the thickness is set relatively thick in the area corresponding to the light source part 161, and a thin part 136Ab in which the thickness is set relatively thin in the area corresponding to the midpoint position between the light source parts 161. The thick part 136Aa corresponds to a low transmittance part with low transmittance, and the thin part 136Ab corresponds to the high transmittance part with high transmittance.

In this embodiment, the thick part 136Aa and the thin part 136Ab of the transmittance adjustment part 136A can balance the luminosity between when the first light source 161*a* is turned on, and when the second light source 161*b* is turned on, similarly to the first embodiment. Thus, unevenness in the luminosity generated by the first light source 161*a* and the second light source 161*b* can be restricted from being generated.

Third Embodiment

Figure 6:
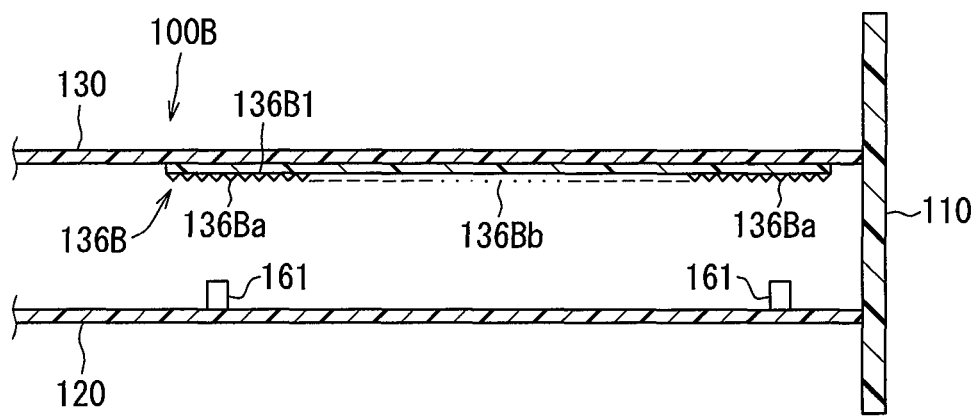
FIG. 6 is a sectional view illustrating a transmittance adjustment part according to a third embodiment.

A meter 100B according to a third embodiment is shown in FIG. 6. The transmittance adjustment part 1366 of the meter 1006 of the third embodiment includes a lens 136B1, and a dark part 136Ba and a light part 136Bb are provided on the lens 136B1, in comparison to the transmittance adjustment part (light-and-shade translucent part) 136 of the first embodiment.

The lens 136B1 is formed tabular and made of, for example, polycarbonate resin or acrylic resin, and light can pass through the lens 136B1. The lens 136B1 is arranged on the dial 130 to face the substrate 120. Furthermore, the dark part 136Ba and the light part 136Bb are formed on the surface of the lens 136B1 facing the substrate 120 by the printing method.

The dark part 136Ba and the light part 136Bb are formed as shade by halftone dot printing and solid printing. The dark part 136Ba is formed in the area corresponding to the light source part 161, and the light part 136Bb is formed in the area corresponding to the midpoint position between the light source parts 161. The dark part 136Ba corresponds to a low transmittance part with low transmittance, and the light part 136Bb corresponds to the high transmittance part with high transmittance.

In this embodiment, the dark part 136Ba and the light part 136Bb of the transmittance adjustment part 136B can balance the luminosity between when the first light source 161*a* is turned on, and when the second light source 161*b* is turned on, similarly to the first embodiment. Thus, unevenness in the luminosity generated by the first light source 161*a* and the second light source 161*b* can be restricted from being generated.

The dark part 136Ba and the light part 136Bb are not limited to be formed on the surface of the lens 136B1 facing the substrate 120. Alternatively, the dark part 136Ba and the light part 136Bb may be formed on a surface of the lens 136B1 facing the dial 130, or both the surface facing the substrate 120 and the surface facing the dial 130.

As a modification in the third embodiment, a dark part and a light part may be formed by texturing the surface facing the substrate 120, the surface facing the dial 130 or both of the surface facing the substrate 120 and the surface facing the dial 130, while the lens 136B1 is formed as resin cast product or sheet press product (the shade is produced by emboss processing). The emboss means fine concavo-convex patterns. The dark part is formed by raising the density of emboss, or the light part is formed by lowering the density of emboss.

Fourth Embodiment

Figure 7:
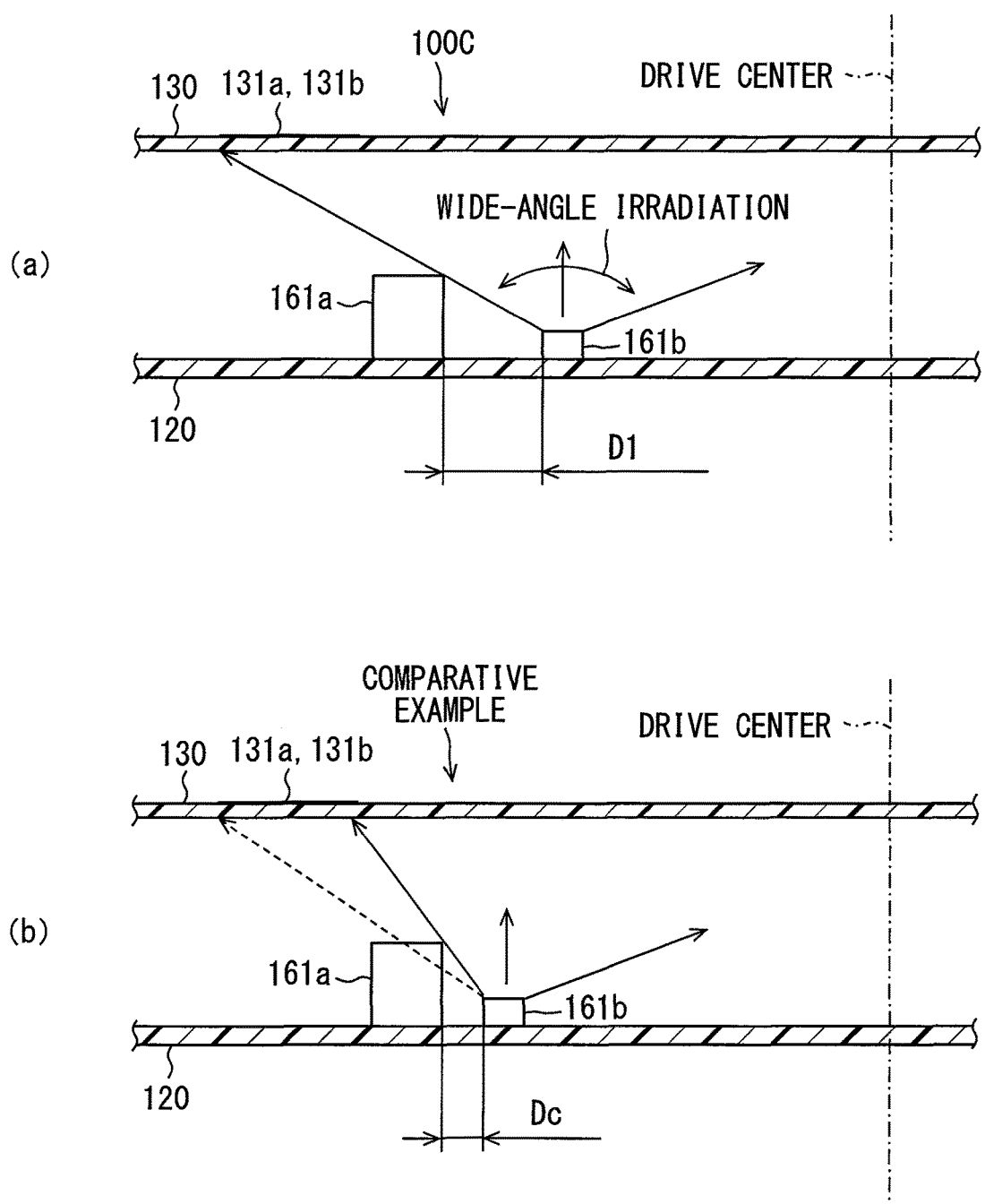
FIG. 7 is a diagram illustrating a spatial relationship between a first light source and a second light source according to a fourth embodiment.

A meter 100C according to a fourth embodiment is shown in FIG. 7 (*a*). Compared with the meter 100 of the first embodiment, in the meter 100C of the fourth embodiment, the distance between the light sources 161*a* and 161*b* is set to be a predetermined distance D1, in case where a dimension in a direction directed from the substrate 120 toward the dial 130 (hereafter referred to a height dimension) is different between the first light source 161a and the second light source 161b.

In some cases, the first light source 161a and the second light source 161b have different sizes. In this embodiment, for example, as shown in FIG. 7, the size of the second light source 161b is smaller than that of the first light source 161a. That is, the height dimension of the second light source 161b is smaller than that of the first light source 161a.

In such a case, as shown in FIG. 7 (b), as a comparative example, if the distance Dc between the light sources 161a and 161b is smaller than the predetermined distance D1, a part of light emitted from the second light source 161b is interrupted by the first light source 161a. As a result, the numeric character part 131a and the scale part 131b cannot be made to emit light with the predetermined luminosity.

Therefore, in this embodiment, as shown in FIG. 7 (a), the distance between the first light source 161a and the second light source 161b which are aligned radially is set as a predetermined distance such that the light from the second light source 161b reaches the numeric character part 131a and the scale part 131b (information item) without being interrupted by the first light source 161a.

Thus, in case where the size is different between the first light source 161a and the second light source 161b, the distance between the light sources 161a and 161b is set as a predetermined distance, such that the light from the second light source 161b reaches the numeric character part 131a and the scale part 131b (information item) without being interrupted by the first light source 161a. Accordingly, unevenness in the luminosity can be controlled. That is, wide-angle irradiation is attained by the second light source 161b, though the height dimension is small, and unevenness in the luminosity is restricted.

Other Embodiment

In each of the embodiments, the display device is applied to the speed display part 131, the fuel residual quantity display part 132, the rotation display part 133, and the water temperature display part 134 of the dial 130. Alternatively, it is possible to apply the display device to other display parts.

The display device is applied to the combination meter 100, 100A, 1006, 100C for a vehicle, but is not limited to this. The display device may be applied to other display parts, for example, a display device for an equipment.

What is claimed is:
1. A display device comprising:
  a dial having an information item disposed around an outer periphery side with respect to a predetermined central part in a circumferential direction;
  a substrate arranged at a side of the dial opposite from a visual confirmation side;
  a plurality of light source parts arranged on the substrate in the circumferential direction to correspond to the information item, the light source part causing the information item to emit light; and
  a transmittance adjustment part arranged on the dial to face the substrate, the transmittance adjustment part having a low transmittance part in which a transmittance of light is lower than a predetermined value and a high transmittance part in which a transmittance of light is higher than that of the low transmittance part, the transmittance adjustment part adjusting a transmittance of light from the plurality of light source parts, wherein
  each of the light source parts includes a first light source and a second light source having different light-emission colors to be alternately switched on lighting,
  the first light source and the second light source are arranged in a same alignment order radially from the predetermined central part, and
  the low transmittance part is located within an area corresponding to the plurality of light source parts, and the high transmittance part is located based on a midpoint position where a distance from the light source parts adjacent to each other is equal in the circumferential direction between the light source parts,
  each of the plurality of light source parts is located adjacent to the information item in the radial direction, the first light source and the second light source are located adjacent to each other in the radial direction, the low transmittance part is located adjacent to the plurality of light source parts in the radial direction, and the high transmittance part is located at a midpoint position between the light source parts adjacent to each other in the circumferential direction.
2. The display device according to claim 1, wherein
the transmittance adjustment part is a light-and-shade translucent part formed by printing, in which the low transmittance part is printed as a dark part and the high transmittance part is printed as a light part.
3. The display device according to claim 1, wherein
a dimension of the second light source is set smaller than the first light source in a direction directed from the substrate toward the dial, and
a distance between the first light source and the second light source which are radially aligned is set as a predetermined distance such that a light from the second light source reaches the information item without being interrupted by the first light source.

* * * * *